United States Patent

[11] 3,634,824

[72] Inventors Leon Zinn
Syossit, N.Y.;
Milton Bodin, Teaneck, N.J.
[21] Appl. No. 874,160
[22] Filed Nov. 5, 1969
[45] Patented Jan. 11, 1972
[73] Assignee AFA Protective Systems, Inc.
New York, N.Y.

[54] SIGNALING SYSTEM UTILIZING FREQUENCY AND FREQUENCY DURATION FOR SIGNALING AND CONTROL FUNCTIONS
22 Claims, 8 Drawing Figs.

[52] U.S. Cl. .......... 340/147 R, 340/167 A, 340/171 R
[51] Int. Cl. .......... H04q 9/00
[50] Field of Search .......... 340/147 PC, 147, 167, 171, 163

[56] References Cited
UNITED STATES PATENTS

| | | | |
|---|---|---|---|
| 3,289,170 | 11/1966 | Currey et al. | 340/147 UX |
| 3,302,113 | 1/1967 | Clay | 340/163 |
| 3,475,727 | 10/1969 | Young et al. | 340/167 A |
| 3,518,628 | 6/1970 | Giel et al. | 340/167 |

*Primary Examiner*—Donald J. Yusko
*Attorney*—Blum, Moscovitz, Friedman & Kaplan

ABSTRACT: A signaling system having a plurality of remote stations for detecting the states of monitors associated therewith and for transmitting a signal representative of said states along signal transmission means to a central station in response to an interrogation signal transmitted by said central station. Both the interrogation and state signals include tone pulses the characteristics of which permits the selective interrogation of each of said remote stations and the identification of the state signals therefrom at the central station for the purposes of disposing utilization circuits in a state representative of the state of said monitors.

INVENTORS
LEON ZINN
MILTON BODIN
BY
Blum, Moscovitz, Friedman & Kaplan
ATTORNEYS INVENTORS
LEON ZINN
MILTON BODIN
BY
Blum, Moscovitz, Friedman & Kaplan
ATTORNEYS INVENTORS
LEON ZINN
MILTON BODIN
BY
Blum, Moscowitz, Friedman & Kaplan
ATTORNEYS INVENTORS
LEON ZINN
MILTON BODIN
BY
Blum, Moscovitz, Friedman & Kaplan
ATTORNEYS INVENTORS
LEON ZINN
MILTON BODIN
BY
Blum, Moscovitz, Friedman & Kaplan
ATTORNEYS

SIGNALING SYSTEM UTILIZING FREQUENCY AND FREQUENCY DURATION FOR SIGNALING AND CONTROL FUNCTIONS

BACKGROUND OF THE INVENTION

This invention relates generally to signaling systems of the type useful in alarm, monitoring and industrial control systems where information must be transmitted by a plurality of remote stations to a central station for the purposes of recording or displaying such information. In the art, the traditional central alarm systems have been DC systems utilizing relays and the like and requiring the laying of special cabling between each remote station and between said remote station and the central station. Further, because of the nature of the equipment involved, only a limited amount of information could be conveyed by each remote station to the central station. These considerations made the prior art systems relatively expensive and inflexible. Still another approach to such signaling and control systems is the use of multiplexing techniques but the equipment required for the application of multiplexing techniques has proved extremely expensive and complex. By providing a signaling system utilizing tone pulses of predetermined characteristics and providing for the transmission of state information by a remote station in response to an interrogation signal transmitted by the central station, an extremely flexible and efficient system is provided which is particularly adapted for connection to existing telephone lines for the purposes of signal transmission between stations.

SUMMARY OF THE INVENTION

Generally speaking, in accordance with the invention, a signaling system is provided having central station means for applying an interrogation signal including at least a first tone pulse of predetermined characteristics to a signal transmission means for transmission to a plurality of remote stations. Each of said remote stations is adapted to detect the first tone pulse associated therewith and, upon such detection, to transmit to said central station a state signal including at least a second tone pulse different from said first tone pulses associated with the state of the monitor means associated with said remote station. The central station is also adapted to detect said second tone pulse, and upon such detection, to dispose a utilization circuit means in a predetermined state representative of the state of said monitor means.

Said first tone pulses are preferably of uniform tone frequency but of different widths, each of said first tone pulses being associated with a different one of said remote stations. Said second tone pulses are also preferably of a uniform tone frequency different from the tone frequency of said first tone pulses and of a plurality of different widths, each width being associated with a particular state of said monitors. The system is adapted for continuous and automatic operation with each of said first tone pulses being sequentially transmitted to said remote station with a time delay interposed between each successive first tone pulse to permit the return transmission of the state signal including said second tone pulse from each remote station as it is interrogated.

The plurality of remote stations are preferably interconnected by a transmission line, which also interconnects said plurality of remote stations to said central stations, each of said remote stations and central stations being AC coupled to said line. Both the central station and the remote locations identify the desired tone pulses by first passing said tone pulses through a filter adapted to pass only tone pulses of a predetermined frequency, and then comparing the width of the pulse with a reference. The latter operation is performed by producing a square wave pulse of a width equal to the width of the applied tone pulse by means of a DC switch and applying said square wave pulse to detector means having first circuit means for producing a first output responsive to said square wave pulse at a time corresponding to the trailing edge of the second tone pulse if the square wave pulse is of a width equal to or greater than said second tone pulse, second circuit means for producing a second output at the time corresponding to the trailing edge of said square wave pulse and gate means for producing an output signal upon the coincidence of the first and second outputs to indicate the detection of the second tone pulse. The central station also includes missing indicator means for receiving the state signal and for applying a missing indicator activation signal to the control means in the absence of a second tone pulse in the time allocated to each of said remote stations.

The remote station includes a detector for producing a remote station activation signal upon detection of the first tone pulse associated therewith, state signal generator means fired by said remote signal activation signal for selectively producing any one of a plurality of pulses each of a width corresponding to the width of one of said second tone pulses and associated with one monitor means state, and oscillator means for producing tone pulses of a predetermined frequency when fired by the pulse output of said state signal generator means.

Accordingly, it is an object of this invention to provide a signaling system in which each of a plurality of remote stations is continuously and automatically interrogated and, in response to such interrogation, transmits a state signal representative of the state of a monitor associated therewith to said central station which disposes a utilization circuit in a state representative of said monitor state in response to said state signal.

Another object of the invention is to provide a signaling system particularly adapted for application to central station alarm systems with both alarm and normal operation signals being transmitted to the central station for display.

A further object of the invention is to provide a signaling system particularly adapted to use the telephone lines for communication between the remote and central stations thereof.

Still another object of the invention is to provide a signaling system using tone pulses of distinctive characteristics, each remote station being adapted to transmit its state data upon detection of the tone pulse associated therewith.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention reference is had to the following description taken in connection with the accompanying drawings in which.

DESCRIPTION OF THE PREFERRED EMBODIMENTS

OPERATION OF THE SYSTEM

Figure 1:
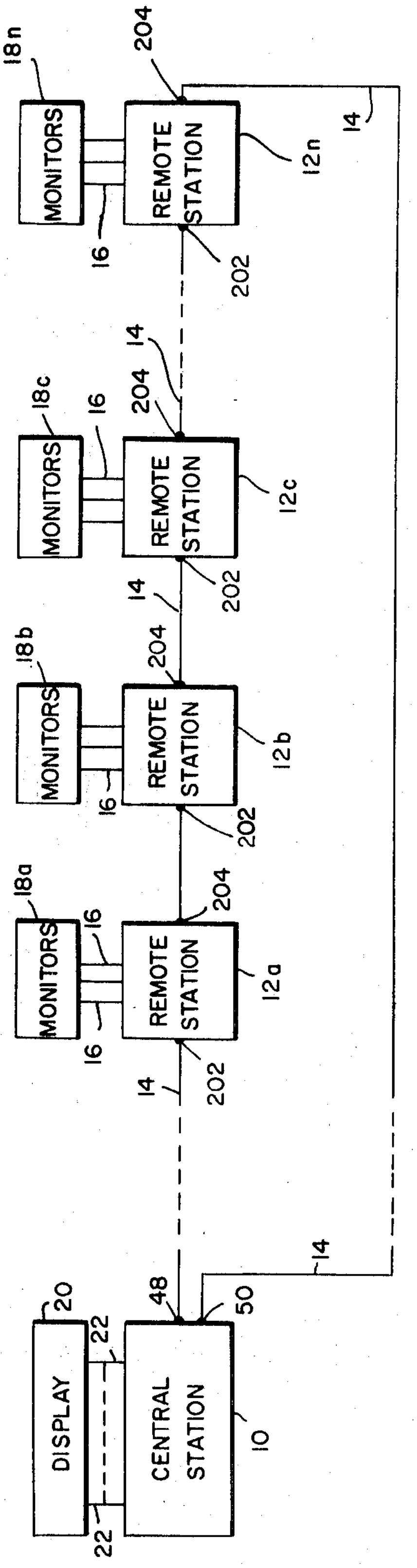
FIG. 1 is a block diagram of the signaling system according to the invention.

Referring now to FIG. 1, the signaling system schematically depicted incorporates a central station 10 and a plurality of remote stations 12*a*, *b*, *c*, ..., *n*. Said remote stations are connected in series by means of transmission line 14 and the group of series-connected remote stations are, in turn, connected to said remote stations by means of said transmission line. Each remote station is connected along lines 16 to one of monitors 18*a*, *b*, *c*,..., *n*, while central station 10 is connected to display 20 by lines 22. The signaling system is adapted to transmit information representative of the state of monitors 18, as detected at each of remote stations 12, through transmission line 14 to central station 10 for display on display 20.

Monitors 18, which may include one or more automatically or manually operable monitoring devices such as relays, switches, gating circuits and switching circuits, are disposable in a plurality of states each representative of a particular condition the existence of which is to be transmitted to the central station. Thus, when applied to alarm systems, the state of said monitors can reflect that conditions at the remote station are normal or that a fire or burglar alarm has been tripped. Display 20 may include both visual and audible indicators as well as printing and other information storage devices. Other utilization circuits such as automatic controls for processing equipment responsive to the transmitted state information may be substituted for display 20 in appropriate applications of the system. Transmission line 14 may be a special cable or existing telephone lines. Each of the central and remote stations are preferably AC coupled to the line for use in modern telephone systems. If desired, radio and other transmission means can be utilized in place of a transmission line for transmitting signals between said central and remote stations.

Transmission of state information by remote stations 12 is initiated in response to an interrogation signal transmitted by central station 10 along transmission line 14. Said interrogation signal includes a series of tone pulses, each having a predetermined tone frequency and width. Each remote station is adapted to be activated only in response to one of the tone pulses in the series. Thus, to continuously and automatically interrogate each remote station during each cycle of operation of the system, the interrogation signal produced by central station 10 consists of a series of *n* tone pulses, each having predetermined characteristics different from the predetermined characteristics of the other of said tone pulses. These interrogation tone pulses are preferably of uniform tone frequency but of different widths. For manual operation, only the tone pulse associated with the remote station to be interrogated would be transmitted.

Upon detection of the particular tone pulse associated therewith, each remote station 12 transmits a state signal representative of the state of the monitors 18 associated therewith back along transmission line 14. The state signal includes at least a tone pulse of predetermined characteristics different from the characteristics of the tone pulses of the interrogation signal. Each remote station may preferably transmit any one of a plurality of state signal tone pulses, each representative of a different state of the monitors 18 associated therewith and each being different from the other of said state signal tone pulses. Said state signal tone pulses are preferably of a uniform tone frequency different from the tone frequency of said interrogation tone pulses and preferably differ in width from each other. Central station 10 detects the particular state signal tone pulse transmitted by each remote station and disposes display 20 in the state indicated thereby to reflect the state of the corresponding monitors 18. In order to provide for the transmission of state signals from the remote stations to the central station, the interrogation signal preferably includes a time delay interposed after each interrogation tone pulse, each remote station transmitting its state signal tone pulse during the time delay immediately following the interrogation tone pulse associated therewith.

Where the monitors 18 at each remote station are substantially identical, such as those monitoring a fire alarm signal in a plurality of remote locations, the state signal tone pulse assigned to like states in each station would preferably have identical characteristics. For example, a tone pulse of a particular characteristic would represent a normal condition at all stations and a second tone pulse of a different width would represent a fire alarm condition at all said stations. Central station 10 would identify which remote station sent which tone pulse by the position of the pulse in the state signal.

CENTRAL STATION

Figure 2:
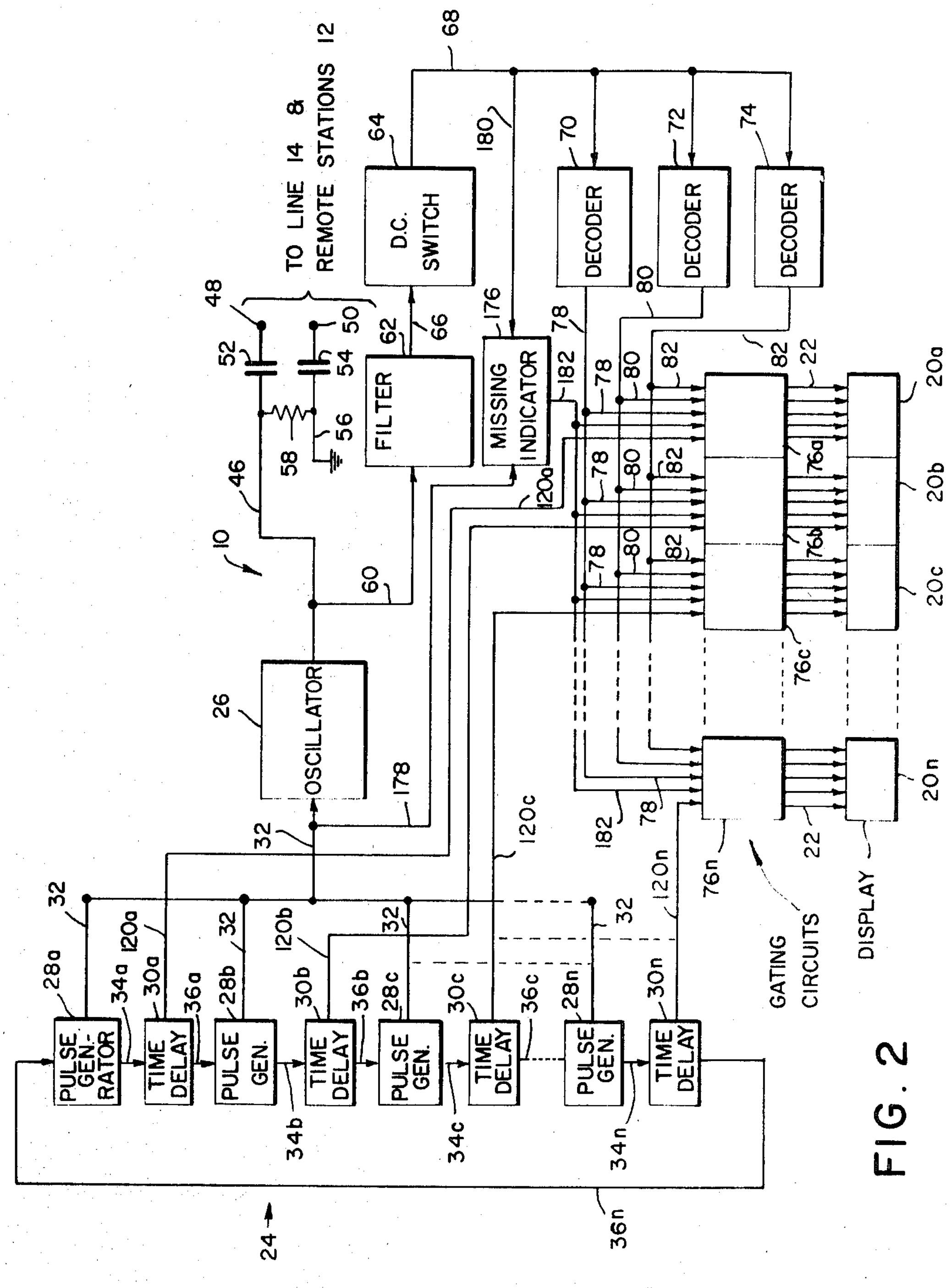
FIG. 2 is a block diagram of one embodiment of the central station of the signaling system of FIG. 1.

A central station for application in a continuously operating, automatic embodiment of the signaling system according to the invention is shown in FIG. 2. The interrogation signal is generated by a modified ring counter 24 which generates during each cycle a series of square wave pulses, each of a different width which fire an oscillator 26 for the duration of each pulse to produce the series of pulse tones of the interrogation signal. Each pulse tone is of a different width and of the tone frequency set by the oscillator. Ring counter 24 consists of a series of pulse generator circuits 28*a*, *b*, *c*, ..., *n* having a like number of time delay circuits 30*a*, *b*, *c*, ..., *n* interleaved therebetween. Each pulse generator 28 produces one of said square wave pulses. The pulse generators are sequentially operated in the ring counter circuit and the train of pulses produced thereby is applied along lines 32 to oscillator 26. The trailing edge of the pulse generated by each pulse generator is applied along the respective line 34*a*, *b*, *c*,..., *n* to activate the time delay circuit 30 connected thereto. At the end of a predetermined period of time, each time delay circuit 30 passes a signal along the respective line 36*a*, *b*, *c*, ..., *n* to fire the next pulse generator to produce the next tone pulse.

Figure 3:
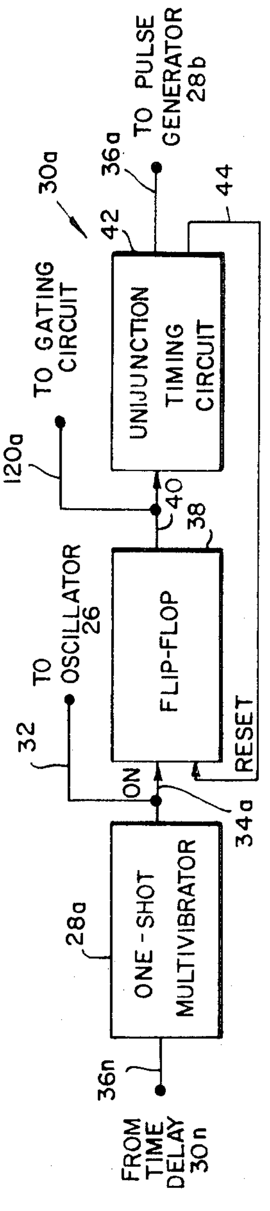
FIG. 3 is a block diagram of one embodiment of the pulse generator and time delay circuits of the central station of FIG. 2.

Referring to FIG. 3, one embodiment of a pulse generator 28*a* and time delay circuit 30*a* is shown. In this embodiment pulse generator 28*a* is a one-shot multivibrator. The width of the pulse produced by said one-shot multivibrator may be selectively adjusted in a conventional manner by selecting the resistance of the RC charging circuit thereof. The output of said multivibrator is applied along line 32 to oscillator 26 to produce the tone pulse and along line 34*a* to flip-flop 38 of time delay circuit 30*a*. The trailing edge of the pulse produced by said multivibrator triggers flip-flop 38 to its on state to produce an output signal along line 40 which triggers unijunction transistor timing circuit 42. By selecting the resistance of the RC charging circuit of the unijunction timing circuit, which is of conventional design, the extent of the time delay between tone pulses may be selected. At the end of the selected period, an output signal is applied by the unijunction timing circuit along line 36*a* to pulse generator 28*b* and a reset signal is passed along line 44 to flip-flop 38 to reset said flip-flop for the next cycle of ring counter 24. The remaining pulse generators and time delay circuits would be of like construction and the entire cycle would be continuously repeated.

The interrogation signal from oscillator 26 is applied through line 46 and an AC coupling to output terminals 48 and 50 of central station 10. This AC coupling consists of capacitor 52 between line 46 and terminal 48, capacitor 54 between equipment ground line 56 and output terminal 50 and shunt resistor 58 between lines 46 and 56. The state signal from remote stations 12 is received from transmission line 14 at terminals 48 and 50 and is tapped off line 46 by line 60. The state tone pulses are preferably of a uniform tone frequency different from the frequency of oscillator 26 and of various widths depending on the monitor state that they represent. The state signal is applied to filter 62 which will pass only a signal of the state signal tone frequency. The output of filter 62 is applied to DC switch 64 along line 66. Said DC switch produces a square wave pulse output of a width equal to the width of the tone pulse applied to filter 62. This square wave pulse is applied to three decoders 70, 72, and 74. One of said decoders is provided for each of the different state signal tone pulses transmitted by the remote stations, in this case three.

Each of said decoders is adapted to compare the width of the square wave applied thereto with a predetermined reference characteristic of the tone pulse associated therewith and to produce an output signal only if a correlation is found. For example, in an alarm system decoder 70 may be assigned to detect state signal tone pulses representative of a fire alarm at a remote station, and in the presence of such a tone pulse, would apply an activation signal representative of this condition to gating circuits 76*a*, *b*, *c*, ..., *n* along line 78. In like manner, decoders 72 and 74, upon detecting the tone pulse assigned to them pass an activation signal along lines 80 and 82 respectively to said gating circuits.

Figure 4:
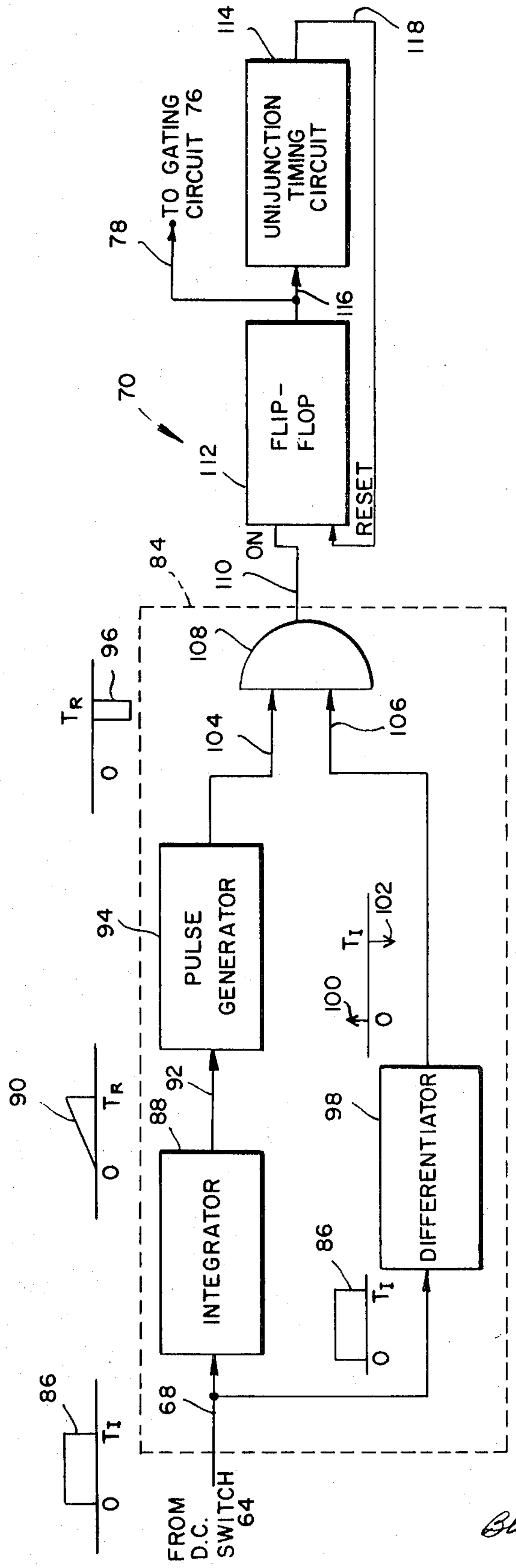
FIG. 4 is a block diagram of one embodiment of the decoder circuits of the central station of FIG. 2.

One embodiment of a decoder for a central station is shown in FIG. 4. The heart of the decoder circuit is the detector 84 which performs the comparison between the preset reference and the width of the input square wave pulse. As shown in FIG. 4, said input square wave pulse 86 is of a duration $T_I$ and is applied along line 68 to two branches of the detector. The first or reference branch of detector 84 incorporates an integrator circuit 88 which produces a ramp signal 90 the slope of which may be selectively adjusted by selecting the resistance of the RC charging circuit thereof. The output of integrator 88 is applied along line 92 to pulse generator 94 to trigger said pulse generator when the voltage of the ramp signal reaches the trigger voltage thereof. By selecting the value of the resistance of said RC charging circuit, the pulse output signal 96 of pulse generator 94 will be produced at a time $T_R$ equal to the width of the tone pulse to which the decoder is to be responsive.

The second branch of detector 84 incorporates a differentiator circuit 98 which differentiates the input square wave pulse to produce a positive pulse 100 at time zero and a negative pulse 102 at time $T_I$.

The outputs of generator 94 and differentiator 98 are applied along lines 104 and 106 respectively to AND-gate 108 which produces an output when pulse signals 96 and 102 coincide. In other words, gate 108 produces an output signal when $T_I$ equals $T_R$. If the input tone pulse is narrower than the tone pulse to which the decoder is to be responsive, then ramp signal 90 of integrator 88 will never reach the trigger voltage of pulse generator 94 and pulse signal 96 will not be produced. If the input tone pulse is wider than the desired pulse, then negative pulse 102 of differentiator 98 will occur at a time $T_I$ later than $T_R$ and no output will be produced by AND-gate 108. The above-described detector circuit may be utilized in each of the decoders 70, 72 and 74, it being merely necessary to select the appropriate resistance value for the integrator of each to render each decoder responsive only to a selected one of said state signal tone pulses.

The output of AND-gate 108 is applied along line 110 to flip-flop 112 to trigger said flip-flop. The output of the flip-flop is applied along line 78 to gating circuits 76 to provide an indication that the appropriate tone pulse was detected. The output of flip-flop 112 is also applied to a unijunction transistor timing circuit 114 along line 116. The output of said unijunction timing circuit, produced at the end of a time delay of predetermined duration, is passed along line 118 to said flip-flop to reset same. When reset, the signal to gating circuit 76 is cut off and the decoder is disposed to receive another state signal tone pulse from the remote stations during the next time delay period of the cycle of ring counter 24.

Each set of gating circuits 76*a*, *b*, *c*, ..., *n* is associated with one of said remote stations 12*a*, *b*, *c*, ..., *n* respectively. During the time delay in the cycle of ring counter 24 associated with each of said remote stations a gating signal is applied along lines 120*a*, *b*, *c*, ..., *n* to gating circuits 76*a*, *b*, *c*, ..., *n* respectively. Referring to FIG. 3, it is seen that this gating signal is tapped off the output of flip-flop 38 which produces a signal during said time delay which is cut off by the resetting of said flip-flop by the firing of unijunction transistor timing circuit 42. Thus, for example, gating circuits 76*a* receive a gating signal along line 120*a* during the time that time delay circuit 30*a* is operative. During this time period, the state signal tone pulse transmitted by remote station 12*a* would be processed by filter 62, DC switch 64 and decoders 70, 72, and 74 to provide a gating signal along one of lines 78, 80 or 82. This gating signal, in conjunction with the gating signal passed along line 120*a* from time delay circuit 28*a* causes the appropriate activation signal to be passed along lines 22 to display circuits 20*a*. In this manner, the state of monitors 18*a* at the remote station is reflected by the state of display 20*a* at the central station. Gating circuits 76*b*, *c*, ...,*n* and display circuits 20*b*, *c*, ..., *n* function in a like manner.

Figures 5, 6:
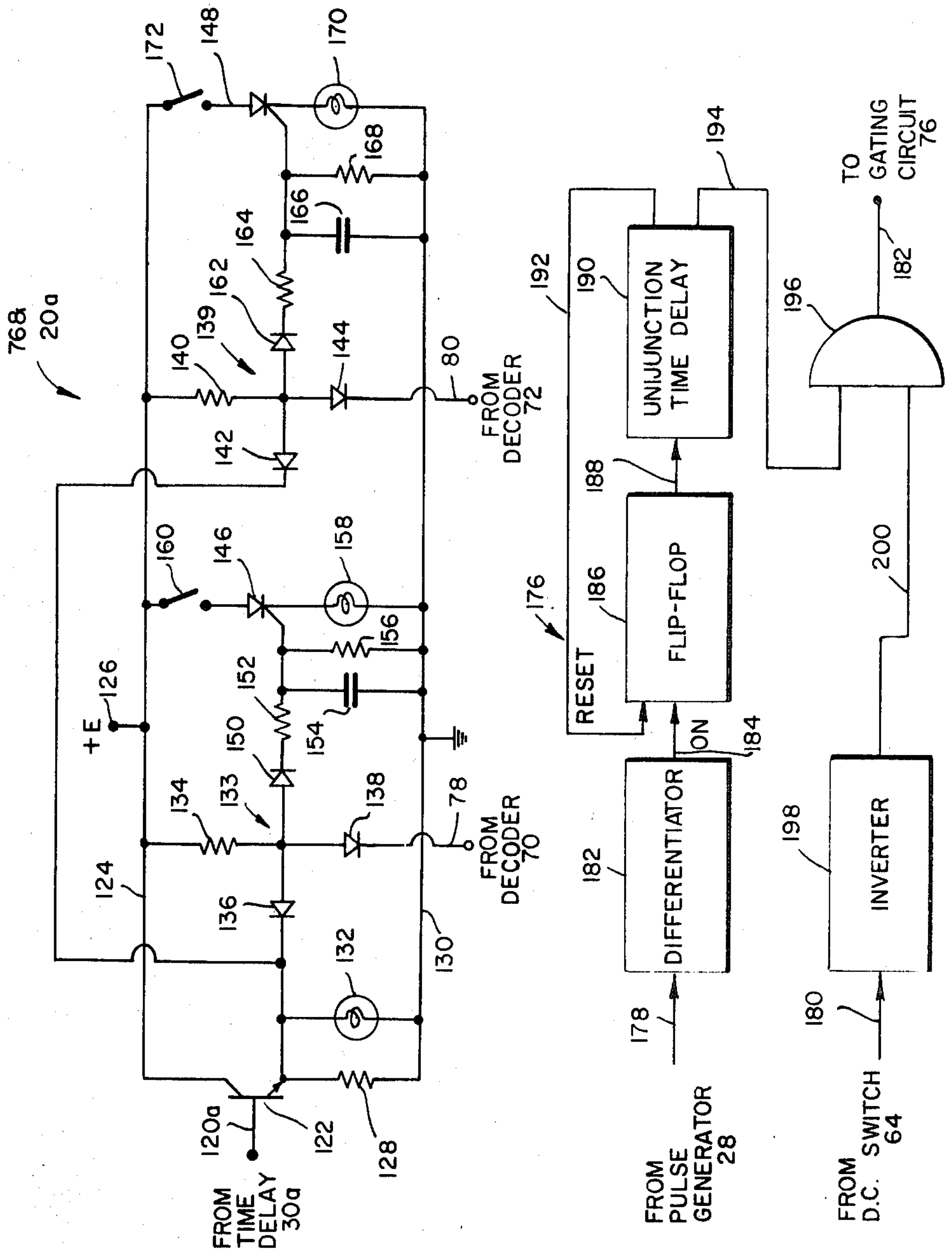
FIG. 5 is a circuit diagram of one embodiment of the gating circuits and display of the central station of FIG. 2.
FIG. 6 is a block diagram of one embodiment of the missing indicator circuit of the central station of FIG. 2.

Reference is had to FIG. 5 which shows a portion of one embodiment of the gating circuits and display according to the invention. The signal from time delay 30*a* is applied to the base of transistor 122 to provide a first gating signal to said circuit. The collector of transistor 122 is connected to the bias voltage line 124, to which a bias voltage +E is applied at terminal 126. The emitter of transistor 122 is connected through resistor 128 to ground line 130. Lamp 132 is connected between said ground line and the emitter of transistor 122 to provide an indication of a signal from time delay 30*a*. In the portion of the circuits shown, two AND-gates 133 and 139 formed by resistor 134 and diodes 136 and 138 and resistor 140 and diodes 142 and 144 respectively are provided to govern the operation of SCR's 146 and 148 respectively. The input to each of said AND-gates consist of the signal from time delay circuit 30*a* as it appears at the emitter of transistor 122 and the gating signal from one of the decoders indicating that that decoder has detected a tone pulse of a duration associated therewith. Thus, the signal from decoder 70 would be passed along line 78 to the cathode of diode 138 while the signal from decoder 72 would be passed along line 80 to the cathode of diode 144. Additional AND gates and SCR's would be provided for each further decoder such as decoder 74 and for other display functions such as the missing indicator discussed below to control the operation of the display.

A gating signal is applied to diodes 136 and 142 once each cycle of ring counter 24, during the period that time delay 30*a* is operative. When during the period that time delay circuit 30*a* is operative, a gating signal from a decoder is applied along line 78, 80 or 82, one of the AND gates of gating circuits 76*a* fires to gate its respective SCR into a conductive state. The circuit for SCR 146 includes diode 150 connected at its anode to the output of AND-gate 133, resistor 152 connected between the cathode of diode 150 and the gate terminal of SCR 146, and capacitor 154 and resistor 156 connected between said gate terminal and ground line 130. A light 158 is connected between the cathode of said SCR and said ground line while switch 160 is connected between the anode of said SCR and the bias voltage line 124. Switch 160 is normally closed and SCR 146 is gated into a conductive state by a gating signal output from AND-gate 133 to light lamp 158. The SCR will remain latched even after the removal of the gating signals until the opening of switch 160 to reset the circuit.

SCR 148 operates in like manner in response to a gating signal from AND-gate 139 and is provided with corresponding diode 162 and resistor 164 in series connection between the anode of diode 142 and the gate terminal thereof. Further, capacitor 166 and resistor 168 are provided between said gate terminal and ground line 130. SCR 148 is also provided with a lamp 170 between its cathode and ground terminal 130 and a switch 172 between its anode and bias voltage line 124.

For most applications of the signaling system according to the invention, it is desirable to provide an indication at the central station of the failure of a particular remote station to respond to an interrogation signal. For this purpose, the central station of FIG. 1 is provided with a missing indicator 176 which compares the output of the pulse generators 28 tapped from line 32 along line 178 with the signal received from the remote stations tapped from line 68 by line 180. A missing indicator signal is produced in the absence of a signal from a remote signal and applied to gating circuits 76*a*, *b*, *c*, ..., *n* along lines 182 to operate the corresponding display 20.

One embodiment of such a missing indicator is shown in FIG. 6. The pulse train output of pulse generators 28 is applied to differentiator 182 which produces an output signal at the trailing edge of each pulse which is applied along line 184 to flip-flop 186 to turn said flip-flop on. The output of flip-flop 186 is passed along line 188 to unijunction transistor time delay circuit 190. One output of said unijunction time delay circuit is applied along line 192 to flip-flop 186 to reset said flip-flop. The other output of said unijunction time delay circuit is applied along line 194 to AND-gate 196. The other branch of AND-gate 196 is derived from DC switch 64 which produces square wave pulses in response to state signals from the local stations. The output of said DC switch is applied to inverter 198 which produces an output signal in the absence of a signal applied thereto, i.e., in the absence of a square wave pulse output from said DC switch. The output of inverter 198 is applied along line 200 to AND-gate 196. Thus, AND-gate 196 will produce an output signal for application to the gating circuits if, within a predetermined period of time after each pulse from each pulse generator 28, a state signal tone pulse is not received back from the decoder.

REMOTE STATION

Figure 7:
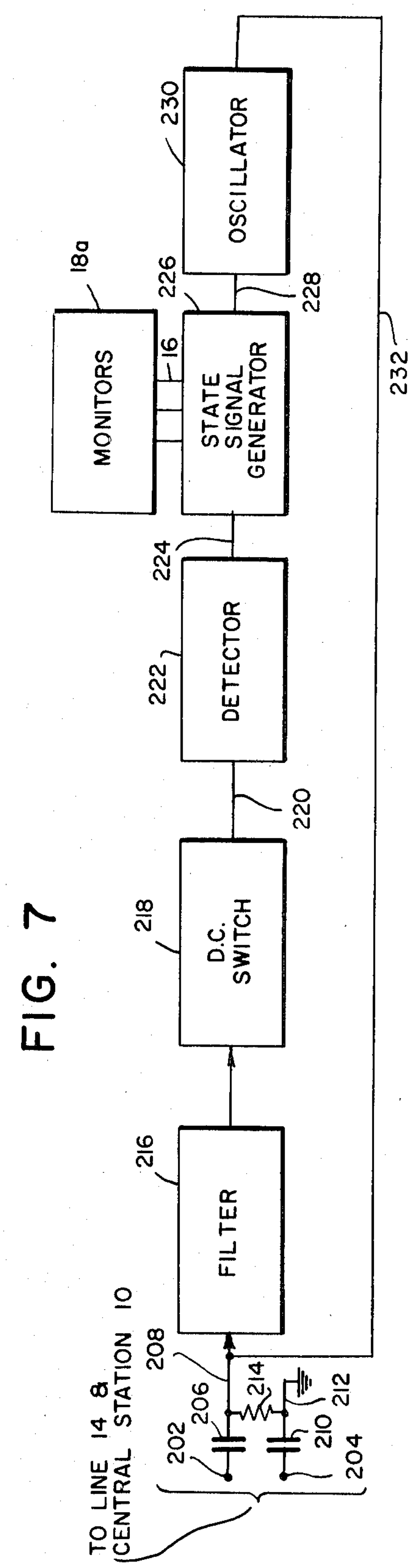
FIG. 7 is a block diagram of one embodiment of the remote station of the signaling system of FIG. 1.

Turning now to remote station 12, one embodiment of said remote station is shown in FIG. 7. Each remote station is provided with a pair of output terminals 202 and 204 for connection to transmission line 14 to receive and transmit interrogation and state signals respectively. Each remote station is AC coupled to said transmission line by means of capacitor 206 interconnecting input line 208 and terminal 202, capacitor 210 interconnecting central station equipment ground line 212 and terminal 204, and resistor 214 interconnecting said equipment ground and input lines. The interrogation signal from the central station is applied to filter 216 which will pass only a tone pulse of the appropriate tone frequency, namely the frequency of oscillator 26 of central station 10. The output of filter 216 is applied to DC switch 218 which produces a square wave pulse of a duration equal to the width of the input tone pulse passed by filter 216. The output of DC switch 218 is applied along line 220 to detector 222 which compares the width of the input square wave pulse with a reference representative of the width of the interrogation signal tone pulse assigned to the particular remote station and produces an activation signal if said input tone pulse correlates with said reference. Thus, each of the interrogation tone pulses transmitted by the central station 10 of FIG. 2 would pass filter 216 and DC switch 218, but only the tone pulse produced by pulse generator 28*a* would cause detector 222 to produce an activation signal.

Detector 222 is connected along line 224 to state signal generator 226 which is also connected along lines 16 to monitors 18*a*. Upon the receipt of the activation signal from the detector, said state signal generator produces an output square wave pulse of a width associated with the state of said monitors. Said pulse is applied along line 228 to fire oscillator 230 which is of a characteristic frequency different from the frequency of oscillator 26 of central station 10 but the same as the frequency passed by filter 62 of said central station. The output of oscillator 230, which consists of a tone pulse of the desired width, is applied along line 232 to input line 208 for transmission along transmission line 14 to central station 10. Detector 222 is preferably identical in structure and operation to detector 84 of the decoder of central station 10 as shown in FIG. 4. By setting the value of the resistance in the RC charging circuit of the integrator of detector 222, the local station can be rendered responsive to a tone pulse of any selected width.

Figure 8:
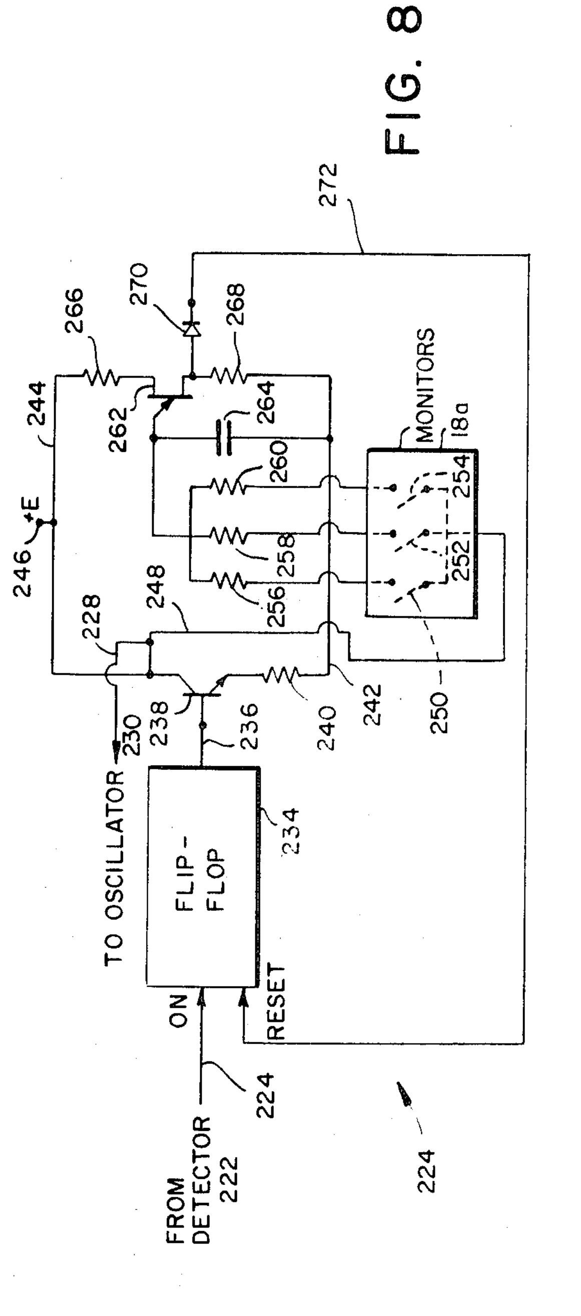
FIG. 8 is a block and circuit diagram of one embodiment of the state signal generator of the local station of FIG. 7.

One embodiment of state signal generator 226 is shown in FIG. 8. The output of the AND gate of detector 222, which is indicative of the receipt of an appropriate tone pulse, is applied along line 224 to fire flip-flop 234. The output of said flip-flop is applied along line 236 to transistor 238 which, together with resistor 240 interconnecting the emitter of said transistor and ground line 142 of the circuit, constitutes an emitter follower stage for isolation purposes. The collector of transistor 238 is connected to bias voltage line 244 to which a bias voltage of +E is applied at terminal 246. One output of the emitter follower stage is taken along line 224 which is connected to oscillator 226 and fires said oscillator so long as flip-flop 234 is on.

The output of said emitter follower stage, taken at the collector of transistor 238, is also applied along line 248 through monitors 18*a* to a unijunction transistor timing circuit adapted to produce a signal after a time delay of any one of a plurality of selected durations. The switching devices 250, 252 and 254 of monitors 18*a* are shown schematically in FIG. 8. Each of said switching devices is coupled through a separate resistor to the emitter of unijunction transistor 262. Said emitter is coupled to ground line 242 through capacitor 264. The unijunction transistor circuit is completed by a resistor 266 interconnecting the first base thereof to bias voltage line 244 and a resistor 268 interconnecting the second base thereof to ground line 242. Thus, depending on which of switching devices 250, 252 or 254 is closed, one of resistors 256, 258 and 260 is connected into the unijunction transistor circuit to provide a charging current for capacitor 264. The time required to charge capacitor 264 to the firing voltage of unijunction transistor 262 is dependent upon the magnitude of the particular resistor 256, 258 or 260 connected in circuit therewith. The output of the unijunction transistor is taken at its second base through diode 270 along line 272 to flip-flop 234 for the purposes of resetting said flip-flop, and therefore cutting off the signal to oscillator 230.

Thus, the period during which flip-flop 234 is in its on state, and therefore firing oscillator 230, is dependent on which of resistors 256, 258 or 260 is in the charging circuit of the unijunction timing circuit. If each of said resistors is associated with a particular state of monitors 18*a*, state signal generator 226 will produce a pulse of a different width for each of said states and the pulse tone applied to transmission line 14 will be of a width associated with a particular monitor state.

The signaling system according to the invention is particularly flexible in that it can be adapted for use with any number of remote stations and can further, be adapted to transmit state information representative of any number of states of monitors 18. The system can be utilized in both manual and automatic configurations and applied to situations where it is necessary to transmit state information from one to another location such as alarm systems, industrial control systems and supervisory systems.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A signaling system for transmitting state information along signal transmission means comprising, central station means connected to said signal transmission means for applying an interrogation signal including at least a first tone pulse of predetermined characteristics to said signal transmission means for transmission thereby, for detecting from said signal transmission means at least a second tone pulse of predetermined characteristics different from said first tone pulse, and for producing a central station activation signal upon such detection; utilization circuit means connected to said central station means and disposable in a predetermined state in response to said central station activation signal; monitor means disposable in a characteristic state; and remote station means connected to said signal transmission means and monitor means for detecting said first tone pulse from said signal transmission means, for producing a remote station activation signal upon such detection, and for applying to said signal transmission means for transmission thereby a state signal including at least said second tone pulse in response to said remote station activation signal and said characteristic monitor means state, said central station means and remote station means each including decoder means for detecting the predetermined characteristics of said second and first tone pulses respectively, said decoder means each having filter means for producing a tone pulse of at least one predetermined frequency and detector means for comparing the width of tone pulses with a reference, whereby said utilization circuit means is disposed in a state representative of said characteristic monitor means state.

2. A signaling system as claimed in claim 1, wherein said monitor means is disposable in a plurality of characteristic states, said remote station means being adapted to generate a plurality of second tone pulses each having predetermined characteristics different from the characteristics of the other of said second tone pulses and each being associated with one of said characteristic monitor means states, said remote station means selectively applying to said signal transmission means in response to said remote station activation signal the second tone pulse associated with the characteristic state in which said monitor means is disposed, said central station means being further adapted to produce a characteristic central station activation signal upon detection of each of said second tone pulses, said utilization circuit means being disposable in a distinctive state in response to each of said characteristic central station activation signals each representative of a characteristic monitor means state.

3. A signaling system as claimed in claim 1, including a plurality of remote station means each connected to said signal transmission means and a monitor means connected to each of said remote station means, said central station means being adapted to generate a plurality of first tone pulses each having a predetermined characteristic different from the other of said first tone pulses, one of said first tone pulses being associated with each of said plurality of remote station means, each of said remote station means being adapted to detect its associated first tone pulse for producing a remote station activation signal in response thereto, said central station means being further adapted to produce a characteristic central station activation signal upon detection of the second tone pulse of each remote station means, said utilization circuit means being disposable in a plurality of predetermined states in response to said characteristic central station activation signals each representative of the state of a respective monitor means.

4. A signaling system as claimed in claim 3, wherein said central station means produces an interrogation signal including a sequential series of said first tone pulses, each of said first tone pulses being followed by a time delay sufficient to permit the interleaved transmission of the state signal of the remote station means associated therewith.

5. A signaling system as claimed in claim 3, wherein said signal transmission means includes a line interconnecting said plurality of remote station means in series connection and interconnecting said central station means and said plurality of series-connected, remote station means, each of said central station means and remote station means being AC coupled with said transmission line.

6. A signaling system as claimed in claim 1, wherein said signal transmission means includes a line interconnecting said central station means and said remote station means, said central station means and remote station means being AC coupled to said line.

7. A central station for actuating utilization circuit means to reflect the state of monitor means disposed at a plurality of remote locations in response to state signals therefrom comprising, generating means for transmitting to said remote locations an interrogation signal to cause the transmission of said state signals, said interrogation signal including a plurality of first tone pulses each having a predetermined characteristic different from the other of said first tone pulses, one of said first tone pulses being associated with each of said plurality of remote locations; decoder means for producing a central station activation signal upon detecting, in said state signals, at least a second tone pulse of predetermined characteristics different from said first tone pulses, said second tone pulse being associated with a characteristic state of said monitor means, said decoder means having filter means for passing a tone pulse of at least one predetermined frequency and detector means for comparing the width of tone pulses with a reference; and control means connected to said decoder means for receiving said activation signal and to said utilization circuit means for disposing said utilization circuit means in a state representative of the state of said monitor means in response to said activation signal.

8. A central station as recited in claim 7, wherein said generator means includes a plurality of sequentially activated pulse generators each adapted to produce a pulse of a width different from the pulses produced by the other of said pulse generators; and an oscillator of a predetermined frequency connected to said pulse generators for firing by the series of pulses received therefrom to produce a series of said first tone pulses.

9. A central station as recited in claim 8, wherein said generator means includes time delay circuit means for incorporating in said interrogation signal, at least once during each cycle of said plurality of pulse generators, a time delay of predetermined duration associated with each of said remote locations, said decoder means detecting the state signal from each remote station during the time delay associated therewith.

10. A central station as claimed in claim 9, wherein said pulse generators are serially connected in a ring counter configuration, said time delay circuit means including a time delay circuit associated with each remote location disposed in said series connection immediately following the pulse generator associated with said remote location for delaying the activation of the next sequential pulse generator for said predetermined duration.

11. A central station as claimed in claim 10, wherein said time delay circuits are connected to said control means and adapted to produce a time delay gating signal during the operation thereof for application to said control means, said control means disposing said utilization circuit means in a state representative of the state of each monitor means of each remote location in response to said time delay gating signal and said central station activation signal.

12. A central station as claimed in claim 7, wherein said decoder means includes filter means for passing only a tone pulse of a predetermined tone frequency; DC switch means for producing a square wave pulse of a width equal to the width of said passed tone pulse; and detector means for comparing said square wave pulse with a reference to produce an activation signal only if said square wave pulse is of a width equal to the width of said second tone pulse.

13. A central station as claimed in claim 12, wherein said detector means includes first circuit means for producing a first output responsive to said square wave pulse at a time corresponding to the trailing edge of said second tone pulse if said square wave pulse is of a width equal to or greater than said second tone pulse; second circuit means for producing a second output at the time corresponding to the trailing edge of said square wave pulse; and gate means for producing said central station activation signal upon the coincidence of said first and second outputs.

14. A central station as claimed in claim 12, including a plurality of detector means each adapted to produce a characteristic central station activation signal upon the application thereto of a square wave pulse of a width equal to one of a plurality of second tone pulses, each of said second tone pulses being of a width different from the width of the other of said second tone pulses and being associated with a characteristic state of said monitor means, said control means being responsive to each of said characteristic central station activation signals to dispose said utilization circuit means in a corresponding state.

15. A central station as claimed in claim 7, including missing indicator means for receiving said state signal and for applying a missing indicator activation signal to said control means in the absence of a second tone pulse from any of said remote locations, said control means being adapted to dispose said utilization circuit means in a state reflecting such lack of state signal in response to said missing indicator activation signal.

16. A remote station for transmission of a signal representative of the state of monitor means associated therewith to a central location in response to an interrogation signal including at least a first tone pulse having predetermined tone frequency and width received therefrom comprising, filter means for receiving said interrogation signal and passing only tone pulses of said predetermined tone frequency; detector means for producing a remote station activation signal in response to a passed tone pulse of said predetermined width; and state signal generator means connected to said monitor means for producing a state signal including at least a second tone pulse having predetermined characteristics different from said first tone pulse and associated with a monitor means state for transmission to said central location.

17. A remote station as claimed in claim 16, wherein said state signal generator means is adapted to selectively produce any one of a plurality of second tone pulses each having characteristics different from the other of said second tone pulses and each representative of a different state of said monitor means.

18. A remote station as claimed in claim 17, wherein said state pulse generator means includes bistable circuit means for producing an output signal beginning upon the activation thereof by said remote station activation signal and continuing until the resetting thereof by a reset signal to define a pulse; time delay circuit means connected to said bistable circuit means, said time delay circuit means being activated by said output signal and producing said reset signal after a time delay of a predetermined duration, said time delay circuit means including means for selectively adjusting the duration of said time delay in response to the state of said monitor means; and oscillator means connected to said bistable circuit means for firing in response to said output signal to produce said second time pulses.

19. A remote station as recited in claim 18, wherein said time delay circuit means includes RC charging circuit means for receiving the output of said bistable circuit means, said means for selectively adjusting the duration of said time delay being adapted to selectively adjust the value of the resistance of said RC charging circuit means to any one of a plurality of resistance values each associated with one of said monitor means states, said RC charging circuit means including a capacitor; and switch means connected to said capacitor for applying said reset signal to said bistable circuit means when the voltage across said capacitor reaches a predetermined value.

20. A remote station as claimed in claim 16, wherein said detector includes DC switch means for producing a square wave pulse of a width equal to the width of the tone pulse passed by said filter means; first circuit means for producing a first output responsive to said square wave pulse at a time corresponding to the trailing edge of said first tone pulse if said square wave pulse is of a width equal to or greater than said first tone pulse; second circuit means for producing a second output at the time corresponding to the trailing edge of said square wave pulse; and gate means for producing said remote station activation signal upon the coincidence of said first and second outputs.

21. A central station alarm system for transmitting information representative of the state of alarm means disposed at a plurality of remote locations along signal transmission means comprising, central station means connected to said signal transmission means for applying thereto an interrogation signal including a plurality of first tone pulses each having predetermined characteristics different from the other of said first tone pulses, one of said first tone pulses being associated with each of said plurality of remote locations, said central station means being adapted to detect from said signal transmission means at least a second tone pulse of predetermined characteristics different from said first tone pulses and to produce a central station activation signal upon such detection; display means connected to said central station means for disposition in a state representative of the state of each of said alarm means in response to said central station activation signal; and a plurality of remote station means each disposed at a remote location and connected to said signal transmission means and an alarm means at said remote location, each of said remote station means being adapted to detect the first tone pulse associated therewith from said signal transmission means, to produce a remote station activation signal upon such detection, and to apply to said signal transmission means for transmission thereby a state signal including at least said second tone pulse in response to said remote station activation signal and the state of said alarm means, said second tone pulse being representative of said alarm means state, said central station means and remote station means each including decoder means for detecting the predetermined characteristics of said second and first tone pulses respectively, said decoder means each having filter means for passing a tone pulse of at least one predetermined frequency and detector means for comparing the width of tone pulses with a reference, whereby said display means reflects the state of each of said alarm means.

22. A central station alarm system as recited in claim 21, wherein said alarm means are disposable in a plurality of characteristic states, each of said remote station means being adapted to generate a plurality of second tone pulses each having predetermined characteristics different from the characteristics of the other of said second tone pulses and each being associated with one of said characteristic alarm means states, each of said remote station means selectively applying to said signal transmission means in response to said remote station activation signal the second tone pulse associated with the characteristic state in which its alarm means is disposed, said central station means being further adapted to produce a characteristic central station activation signal upon detection of each of said second tone pulses, said display means reflecting the characteristic state in which each of said alarm means are disposed in response to said characteristic central station activation signals.

* * * * *